(12) United States Patent
Pischel (10) Patent No.: US 8,033,951 B2
(45) Date of Patent: Oct. 11, 2011

(54) GEARBOX FOR A WIND TURBINE

(75) Inventor: Klaus Pischel, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/771,206

(22) Filed: Apr. 30, 2010

(65) Prior Publication Data

US 2011/0175363 A1    Jul. 21, 2011

(51) Int. Cl.
*F16H 57/08* (2006.01)
(52) U.S. Cl. .......................................................... 475/331
(58) Field of Classification Search .................... 475/331
See application file for complete search history.

(56) References Cited

U.S. PATENT DOCUMENTS

| | | | |
|---|---|---|---|
| 5,663,600 | A | 9/1997 | Back et al. |
| 6,232,673 | B1 | 5/2001 | Schoo et al. |
| 7,259,472 | B2 | 8/2007 | Miyake et al. |
| 2006/0138781 | A1 | 6/2006 | Miyake et al. |
| 2007/0197339 | A1* | 8/2007 | Ryymin et al. ............... 475/331 |
| 2009/0058094 | A1* | 3/2009 | Jansen et al. ..................... 290/55 |
| 2009/0186740 | A1* | 7/2009 | Saenz De Ugarte et al. . 475/331 |
| 2010/0225119 | A1* | 9/2010 | Micu ............................... 290/55 |

FOREIGN PATENT DOCUMENTS

| | | |
|---|---|---|
| EP | 1283359 A1 | 2/2003 |
| EP | 1677005 A1 | 7/2006 |
| FR | 2804727 A1 | 6/2001 |
| WO | 9611338 A1 | 4/1996 |
| WO | 2009141140 A2 | 11/2009 |
| WO | 2010030724 A1 | 3/2010 |

OTHER PUBLICATIONS

European Search Report issued in corresponding EP Application No. 11163971.2, Jul. 27, 2011.

* cited by examiner

*Primary Examiner* — Edwin A Young
(74) *Attorney, Agent, or Firm* — Global Patent Operation; Douglas D. Zhang (57) ABSTRACT

A gearbox device adapted for converting a first torque at a first rotational speed into a second torque at a second rotational speed is provided. The gearbox device includes a hollow gearbox input shaft adapted for inputting the first torque, a transmission unit arranged at least partially within the hollow gearbox input shaft and adapted for converting the first rotational speed into the second rotational speed, and a gearbox output shaft adapted for outputting the second torque.

20 Claims, 8 Drawing Sheets

FIG. 8

GEARBOX FOR A WIND TURBINE

BACKGROUND OF THE INVENTION

The present disclosure generally relates to a drive train of a wind turbine, and in particular relates to a gearbox included in a drive train of a wind turbine. Furthermore, present disclosure generally relates to a method for transferring torque.

Wind turbines are of increasing importance as environmentally safe and reliable energy sources. A wind turbine typically includes a rotor having at least one rotor blade and a hub for converting incoming wind energy into rotational, mechanical energy. A rotation of the hub of the wind turbine is transferred to a main rotor shaft which is connected to an input shaft of a mechanical gearbox. An output shaft of the mechanical gearbox is connected to an electrical generator adapted for converting the mechanical rotational energy output from the mechanical gearbox into electrical energy.

BRIEF DESCRIPTION OF THE INVENTION

In view of the above, a gearbox device adapted for converting a first torque at a first rotational speed into a second torque at a second rotational speed is provided, the gearbox device including a hollow gearbox input shaft adapted for inputting the first torque, a transmission unit arranged at least partially within the hollow gearbox input shaft and adapted for converting the first rotational speed into the second rotational speed, and a gearbox output shaft adapted for outputting the second torque.

According to another aspect, a wind turbine including a rotor, an electrical generator and a gearbox device connected to the rotor and adapted for converting a first torque at a first rotational speed into a second torque at a second rotational speed is provided, the gearbox device including a hollow gearbox input shaft coupled to the rotor and being adapted for inputting the first torque, a transmission unit arranged within the hollow gearbox input shaft and adapted for converting the first rotational speed into the second rotational speed, and a gearbox output shaft adapted for outputting the second torque.

According to yet another aspect, a gearbox device adapted for converting a first torque at a low rotational speed into a second torque at a high rotational speed is provided, the gearbox device including a low speed input shaft having an inner cavity and being adapted for inputting the first torque, at least one planetary drive adapted to convert the low rotational speed into the high rotational speed and to fit at least partially into the inner cavity of the low speed input shaft, and a high speed output shaft adapted for outputting the second torque.

Further exemplary embodiments are according to the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale, but rather serve only for the better understanding of the embodiments.

Figure 1:
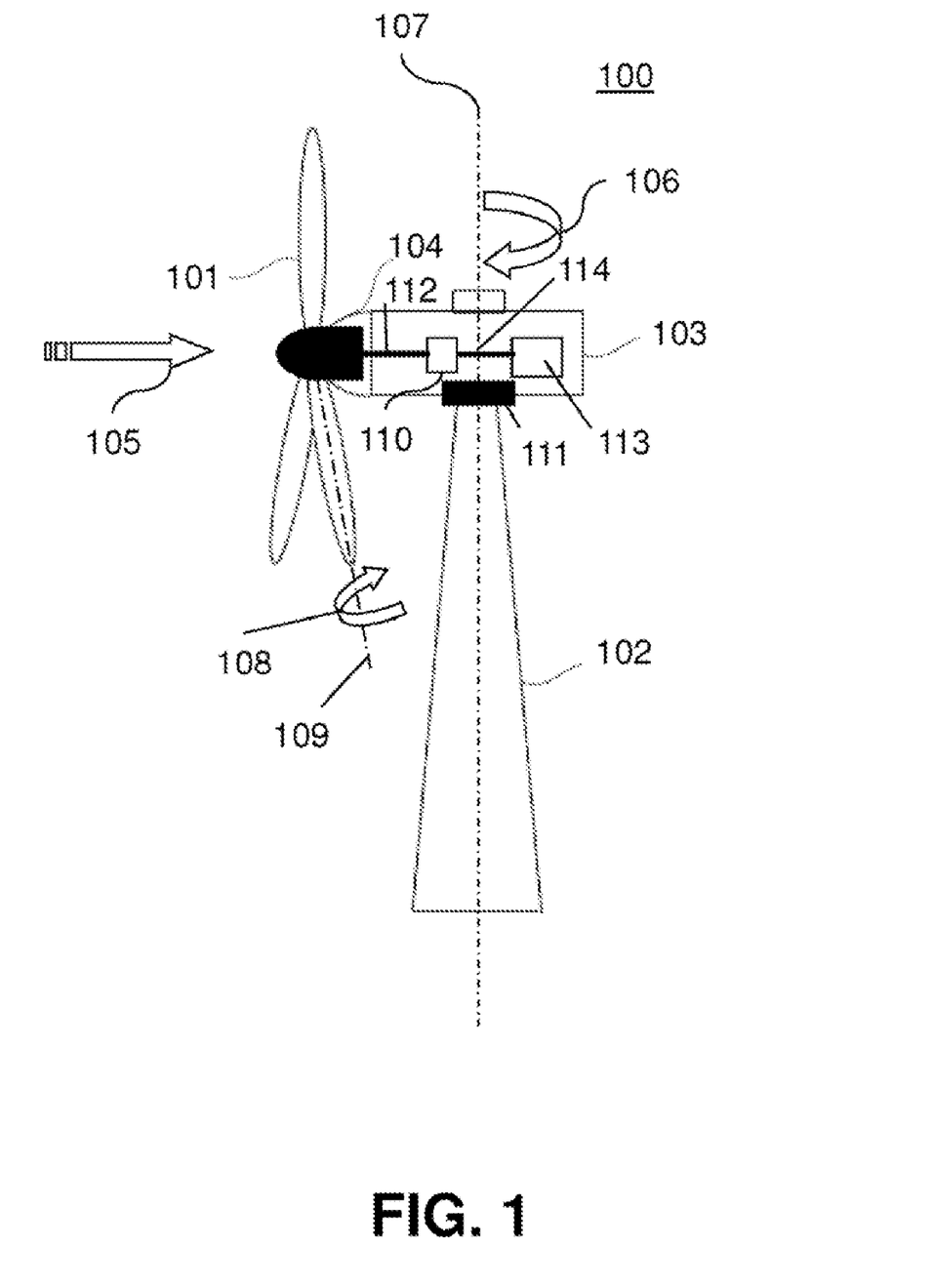
FIG. 1 shows a side view of a wind turbine according to a typical embodiment.

FIG. 1 is an illustrative side view of a wind turbine 100 according to a typical embodiment.

The wind turbine includes a tower 102 which is typically oriented along a vertical axis 107. A machine nacelle 103 of the wind turbine 100 is mounted rotatably atop the tower 102. The machine nacelle 103 may be rotated by means of a yaw drive system 111 included in the machine nacelle 103 in order to direct the machine nacelle 103 and an entire drive train of the wind turbine 100 with respect to the incoming wind direction 105.

The drive train of the wind turbine 100 is schematically illustrated in FIG. 1. The drive train includes a rotor having at least one rotor blade 101 and a hub 104. The rotor of the wind turbine is connected to a rotor shaft 112 such that, on the basis of the incoming wind 105, the rotor is rotated and provides mechanical rotational energy on the basis of the velocity of the incoming wind 105. In order to adapt a rotational frequency of the rotor shaft 112 to the strength or velocity of the incoming wind 105, a pitch angle 108 of an individual rotor blade 101 may be adjusted. Such kind of pitch angle adjustment is a rotation of an individual rotor blade 101 about its longitudinal axis 109.

It is noted here, albeit the rotor is shown to have three individual rotor blades 101, one rotor blade or a plurality of rotor blades may be provided for converting wind energy into rotational energy of the rotor shaft 112.

The rotor shaft is connected to an input shaft of a gearbox 110 which mechanically translates a rotational speed of the rotor shaft 112 (low-speed side) to a rotational output speed (high-speed side) at a gearbox output shaft 114. The gearbox output shaft 114 is connected to an electrical generator 113 for converting the rotational mechanical energy into electrical energy used for power supply.

In accordance with a typical embodiment, it will be explained with respect to FIGS. 3, 5, 6 and 7 that the mechanical gearbox including at least one planetary drive may be designed such that it consumes little mounting space such that the overall weight of the gearbox 110 and thus the entire machine nacelle 103 may be reduced. The yaw drive system 111 is used for changing the yaw angle 106 such that the drive train of the wind turbine may be adjusted with respect to the incoming wind direction 105.

Figure 2:
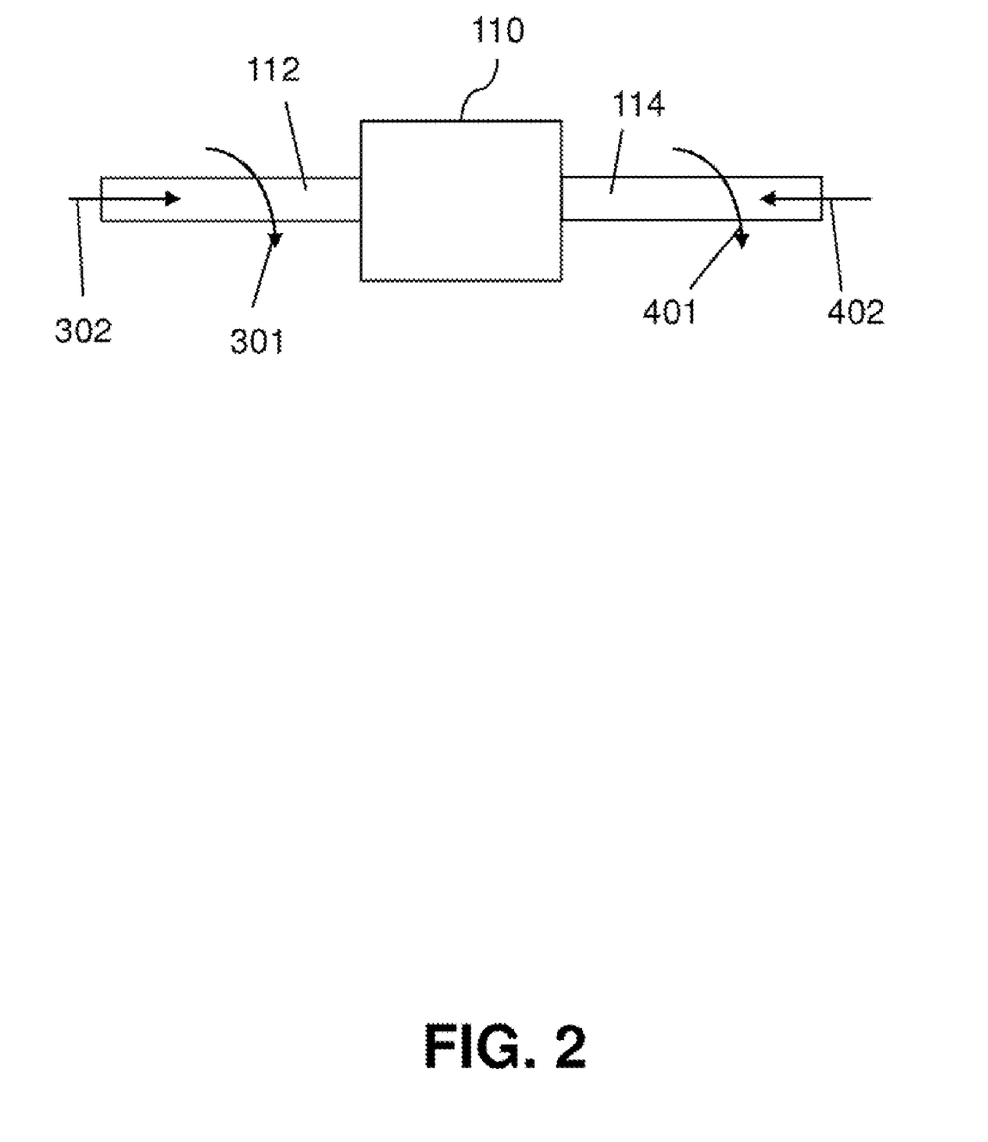
FIG. 2 illustrates components of a drive train of a wind turbine including a mechanical gearbox.

FIG. 2 illustrates a gearbox 110 having an input shaft which typically is the rotor shaft 112 of the wind turbine, and a gearbox output shaft 114. The gearbox may be designed, e.g. for high speed range or for medium speed range wherein the speed range is related to a rotational speed, i.e. rotations per minute (rpm) of the gearbox output shaft of the gearbox device of the wind turbine. Furthermore, the gear ratio will be lower for a medium speed gearbox compared to a high speed gear box. Typically, the gearbox will be selected according to the generator concept applied in the wind turbine. For example, high speed generators typically have rated speeds of about 1,500 rpm so that high speed gearboxes used together with these generators typically have gear ratios of the order of $10^2$. In contrast, medium speed generators have considerably lower speeds so that medium speed gearboxes used together with these medium speed generators typically have gear ratios of the order of $10^1$, i.e. one order of magnitude lower than high speed gear boxes.

The input shaft 112 is the rotor shaft or is connected to the hub of the wind turbine 100 (FIG. 1) where low rotational speeds prevail. The prevailing low rotational speeds typically are in the range of 0 rpm (rotations per minute) to 30 rpm. At the output side of the gearbox 110, higher rotational speeds are present for driving the electrical generator 113 (FIG. 1). Typically, the gearbox 110 may be adapted for an operation in a high speed range or for an operation in a medium speed range. It is noted here that the term "speed range" is related to the rotational speed of the gearbox output shaft 114. The rotational speed of the gearbox output shaft 114 of a high speed gearbox 110 operating in the high speed range typically may range from 1200 rpm to 1800 rpm, and more typically amounts to approximately 1650 rpm. On the other hand, the rotational speed of the gearbox output shaft 114 of a medium speed gearbox 110 operating in the medium speed range typically may range from 100 rpm to 800 rpm, more typically from 200 rpm to 700 rpm, and even more typically amounts to approximately 600 rpm. As described above, the gear ratio of the gear boxes will vary depending on the speed of the generator.

FIG. 2 illustrates a transmission provided by the gearbox 110 such that an input rotational speed 301 (low-speed side, first rotational speed) may be transferred to an output rotational speed 401 (high-speed side, second rotational speed).

Vice versa, an input torque 302 (high torque side, first torque) at the rotor of the wind turbine 100 is transferred to an output torque 402 (low torque side at the electrical generator 113, second torque).

It is noted here that the torques 302, 402 and the rotational speeds 301, 401 at the rotor shaft 112 and the gearbox output shaft 114 are inversely proportional to each other, respectively. It is noted here that the arrows 301, 401 and 302, 402 indicate a specific direction of rotational speed and torque, respectively.

Furthermore, it is noted here that the gearbox in accordance with a typical embodiment may be used for other systems besides wind turbines, such as mechanical driving systems where the input rotational speed is higher than the output rotational speed. In this case, output and input shafts of the gearbox are exchanged, i.e. an input torque (at a high rotational speed) is applied at the shaft 114, and an output torque at a low rotational speed is provided at the shaft 112 as an output.

Figure 3:
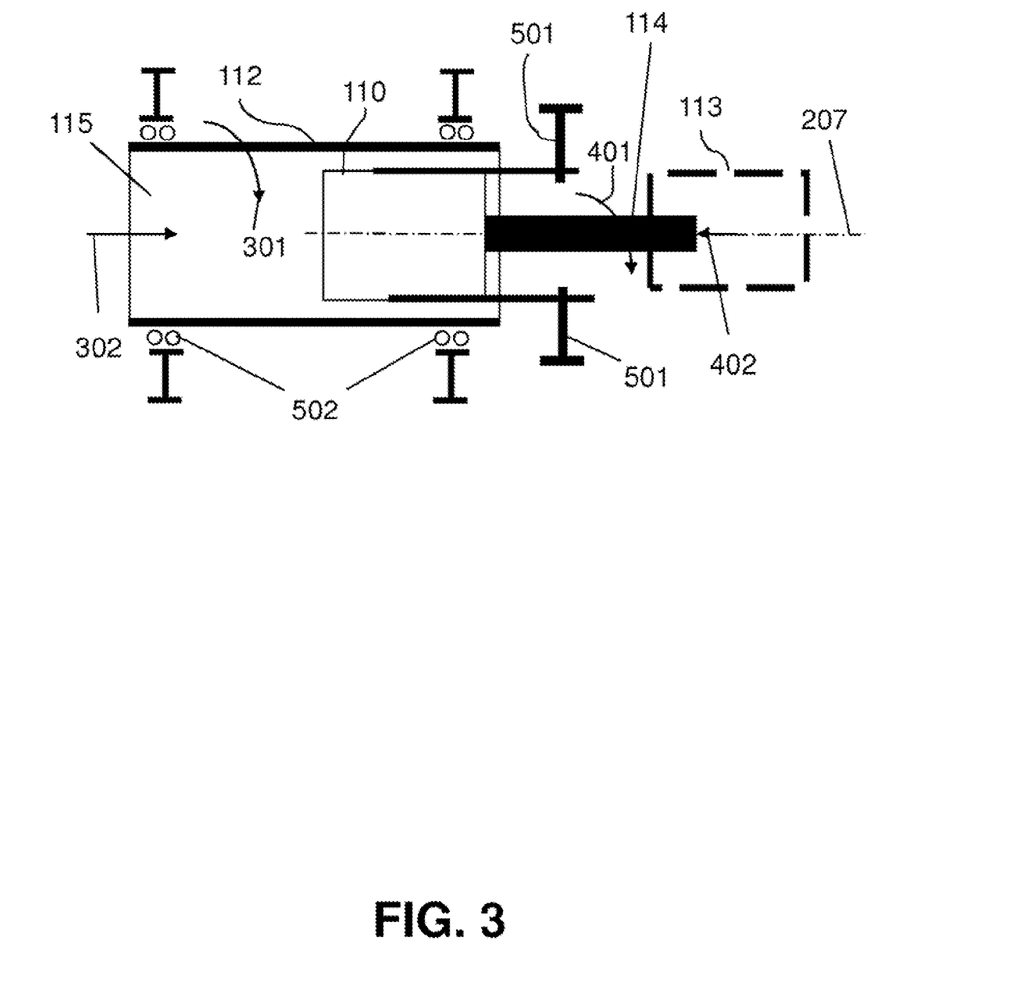
FIG. 3 illustrates a drive train of a wind turbine wherein the gearbox of the wind turbine is housed within a hollow rotor shaft, according to a typical embodiment.

FIG. 3 is a side sectional view of a gearbox device in accordance with a typical embodiment.

As shown in FIG. 3, the rotor shaft 112 which is driven by the input torque 302 in a rotational direction 301 has an inner cavity 115, e.g. the rotor shaft 112 is a hollow shaft. Two bearings of the hollow shaft (at two positions along the length of the hollow shaft 112) are indicated by a reference numeral 502. These rotor shaft bearings 502 provide a rotatable support of the entire rotor of the wind turbine 100 (see FIG. 1).

A reference numeral 115 indicates a rotor shaft cavity (inner cavity). The rotor shaft cavity 115 houses the gearbox 110 which may be provided as a planetary drive of one or more stages or with a helical gear stage as last stage of a multi-stage gearbox. An output shaft, i.e. the gearbox output shaft 114 of the gearbox 110, may be connected directly to the electrical generator 113 (broken lines in FIG. 3).

The gearbox output shaft 114 provides the output rotational speed 401 and the output torque 402 for the electrical generator 113. As the gearbox 110 is supported within the rotor shaft cavity 115 of the rotor shaft 112, it is possible to save mounting space and weight. The entire rotor of the wind turbine 100 may be rotatably supported by two rotor shaft bearings 502.

Figure 4:
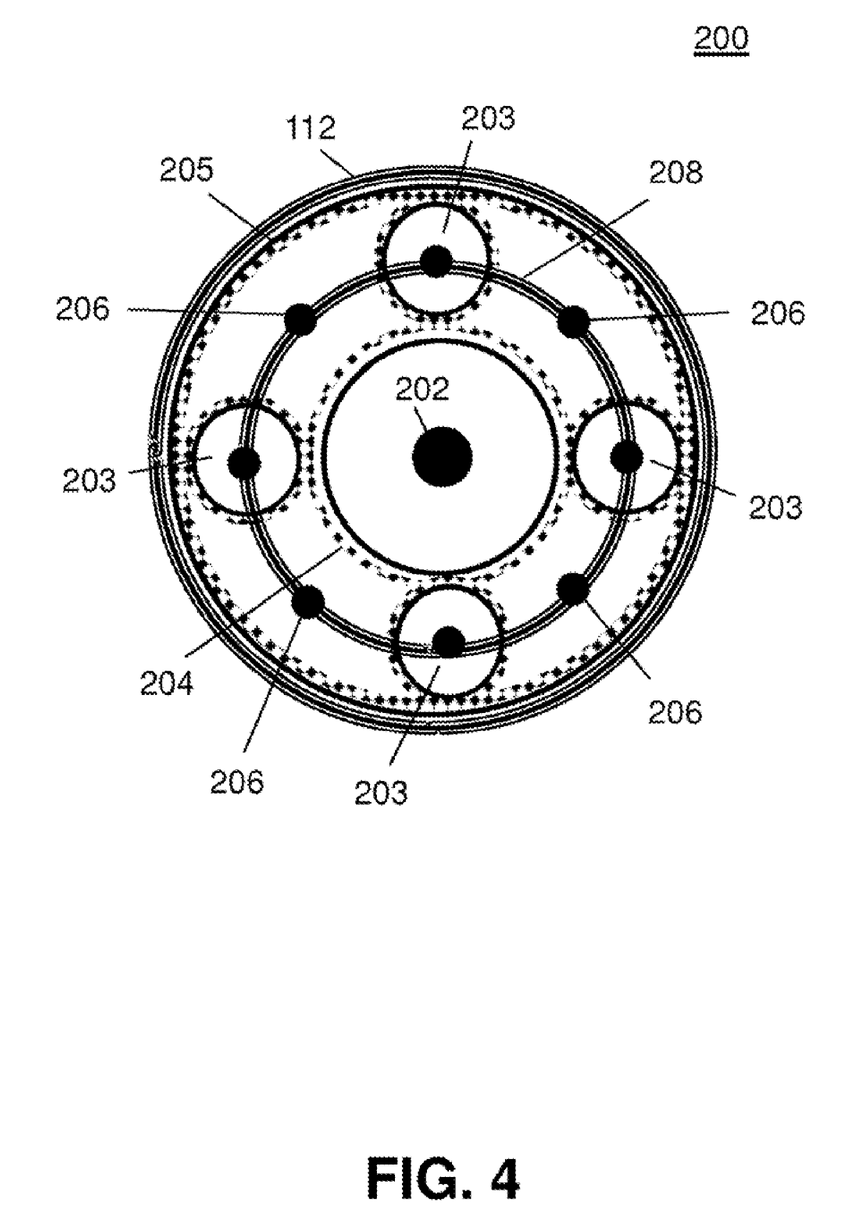
FIG. 4 is a cross-sectional view of a planetary drive used in a gearbox, according to a typical embodiment.

In the following FIGS. 4, 5, 6 and 7 a gearbox 110 based on planetary drives will be described in more detail. FIG. 4 is a cross-sectional view of a planetary drive 200. The planetary drive includes a central sun gear 204 surrounded by a number (in this case four) planet gears 203 which mesh with the central sun gear 204.

The planet gears 203 are held rotatably at a planetary carrier 208 which is connected to a planet gear support 206 (at four positions in the example shown in FIG. 4). The four planet gears 203 further mesh with an outer ring gear 205 which in case of the wind turbine gearbox 110 is fixed by a stationary torque receiving element 501 (see FIGS. 5, 6 and 7 below).

According to another typical embodiment the planet carrier 208 may be fixed by the torque receiving element 501, and the outer ring gear 205 may be rotated by the rotor shaft 112. In this embodiment and in the embodiment shown in FIG. 4 the rotor shaft 112 is provided as an input shaft of the gearbox 110 such that a rotor torque may be transferred to the gearbox, and the output shaft 114 of the gearbox 110, respectively.

It is noted here, however, that the planetary drive according to a typical embodiment may be operated vice versa, i.e input and output means may be replaced by each other, albeit not illustrated in the drawings. In accordance with such an embodiment, which may be combined with other embodiments described herein, the shaft 112 may be provided as an output shaft of the gearbox 110 such that an input torque may be applied at the gearbox shaft 114 and may be transferred to the output side, respectively. In this case the output rotational speed at a gearbox output is lower than an input rotational speed applied at the gearbox shaft 114.

Furthermore, it is noted here that transverse and axial forces which do not contribute to the driving torque of the rotor, may be applied via the rotor. According to yet another typical embodiment, these transverse and axial forces are taken up by the input shaft 112 which is rotatably supported by two rotor shaft bearings 502, see FIGS. 6 and 7. These rotor shaft bearings 502 may efficiently absorb transverse and axial forces applied via the input shaft 112.

As will be described with respect to FIG. 5 below, the planet gear support 206 is rotated by the rotor shaft 112 wherein the outer ring gear 205 is not rotating. This results in a rotation of the sun gear 204 meshing with the planet gears 203 such that the output rotational speed at a gearbox output shaft 202 is larger than an input rotational speed applied at the planet gear support 206.

Figure 5:
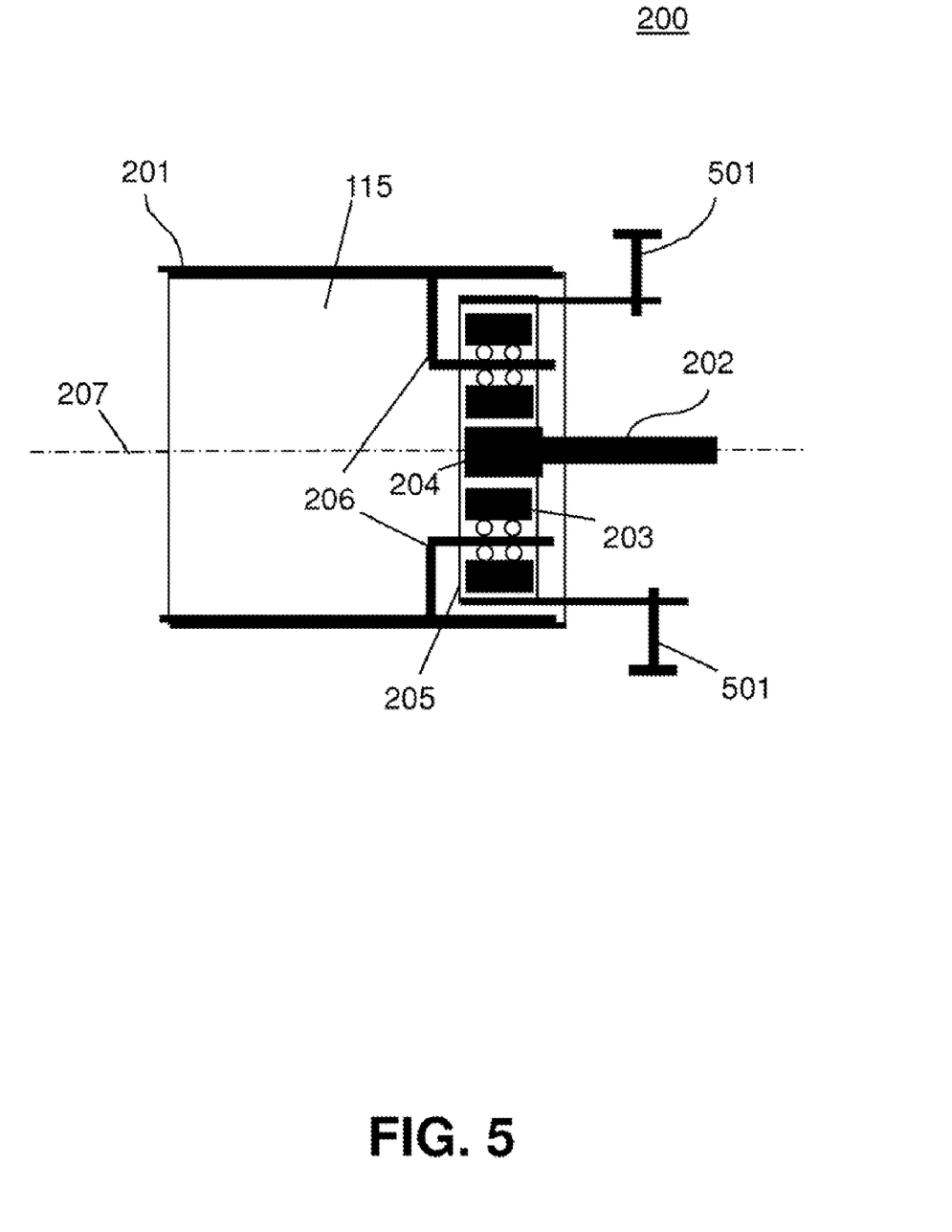
FIG. 5 is a longitudinal sectional view of a single-stage planetary drive, according to a typical embodiment.

Moreover it is possible, albeit not shown in FIG. 5, that the planet gear support 206 is not rotating (held and fixed by the torque receiving element 501) while the outer ring gear 205 is rotated by the rotor shaft 112. This also results in a rotation of the sun gear 204 meshing with the planet gears 203 such that the output rotational speed at a gearbox output shaft 202 is larger than an input rotational speed applied at the planet gear support 206.

FIG. 5 is a schematic side cross-sectional view of a planetary drive 200 which is housed, at least partially, within a hollow gearbox input shaft 201 or a rotor shaft cavity 115 of a rotor shaft 112 (see above), respectively. The planet gear support 206 is schematically shown to be connected with the hollow gearbox input shaft 201. The hollow gearbox input shaft 201 typically is at the low speed side, i.e. at the side where low rotational speeds prevail, the hollow gearbox input shaft 201 thus being referred to as a low speed input shaft, wherein the gearbox output shaft may be referred to as a high speed output shaft which may be connected to the electrical generator. The outer ring gear 205 described herein above with respect to FIG. 4 is fixed (not rotating) by means of the torque receiving element 501.

If the hollow gearbox shaft 201 rotates, then the gearbox output shaft 202 is rotating (in the same direction), wherein the rotational velocity of the gearbox output shaft 202 is higher than the rotational velocity of the hollow gearbox input shaft 201.

According to a typical embodiment at least one planetary drive 200 may be used as a means for adapting rotational speeds of an electrical generator 113 (high speed side) to rotational speeds of a rotor of a wind turbine 100 (low speed side). Axes of rotating components may be oriented along a common axis or may even coincide with a central gearbox axis 207.

As can be seen from the schematic illustration of FIG. 5, one or a plurality of planetary drives 200 can be housed within the rotor shaft cavity 115 of the hollow gearbox input shaft 201. Thus, it is possible to save mounting space and weight of the machine nacelle 103 of the wind turbine 100.

The number of planet gears 203 is not limited to four planet gears as shown herein above with respect to FIG. 4, but any number of planet gears 203 may be used within the planetary drive 200, as long as enough space is available. The hollow gearbox input shaft 201 may be provided as the rotor shaft 112 of the wind turbine. In this case, the rotor shaft 112 has a large bending stiffness.

As the planetary drives themselves are compact in design and include a common coaxial axis 207, mounting space may be saved if components of the planetary drives 200 are installed within the rotor shaft cavity 115. FIG. 5 illustrates a single-stage planetary drive arranged within the rotor shaft cavity 115. It is, however, possible to arrange two-stage, three-stage and multistage planetary drives 200 successively within the hollow gearbox input shaft 201. In this case, the respective outer ring gears 205 of each planetary drive 200 may be connected to the torque receiving element 501 which is elastically supported e.g. at a bed plate of the machine nacelle 103 of the wind turbine 100.

Figure 6:
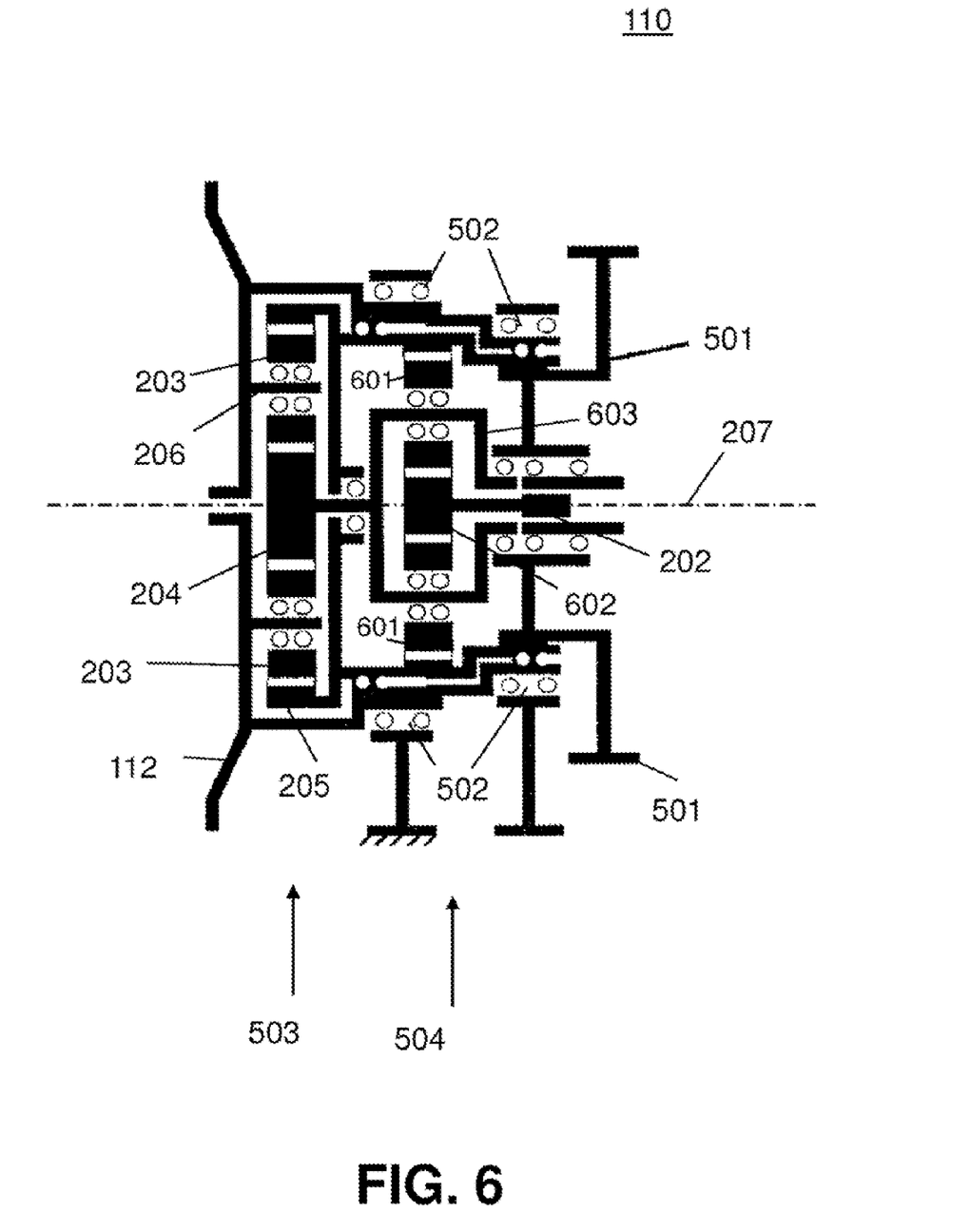
FIG. 6 is a cross-sectional view of a two-stage planetary drive, according to another embodiment.

FIG. 6 is a longitudinal sectional view of a two-stage planetary drive arranged within a gearbox 110 of a wind turbine 100, according to a typical embodiment. A rotor shaft 112 is used as a housing for the two-stage planetary drive. As illustrated herein above, with respect to FIG. 5, respective outer ring gears 205 of the two stages of the planetary drives 503, 504, i.e. the first stage planetary drive 503 and the second stage planetary drive 504, are fixed by means of the torque receiving element 501 such that the respective outer ring gears 205 are not rotating.

The rotating parts include the planet gear support 206 (first stage) and a second stage planet gear support 603.

Thus the sun gear 204 of the first stage meshing with the planet gears 203 is driven such that the output rotational speed of the first stage planetary drive 503 is higher than the input rotational speed applied at the planet gear support 206 of the first stage. A second stage sun gear 602 of the second stage planetary drive 504 meshing with second stage planet gears 601 of the second stage is driven such that the output rotational speed of the second stage planetary drive 504 is larger than the input rotational speed applied at the second stage planet gear support 603.

Figure 7:
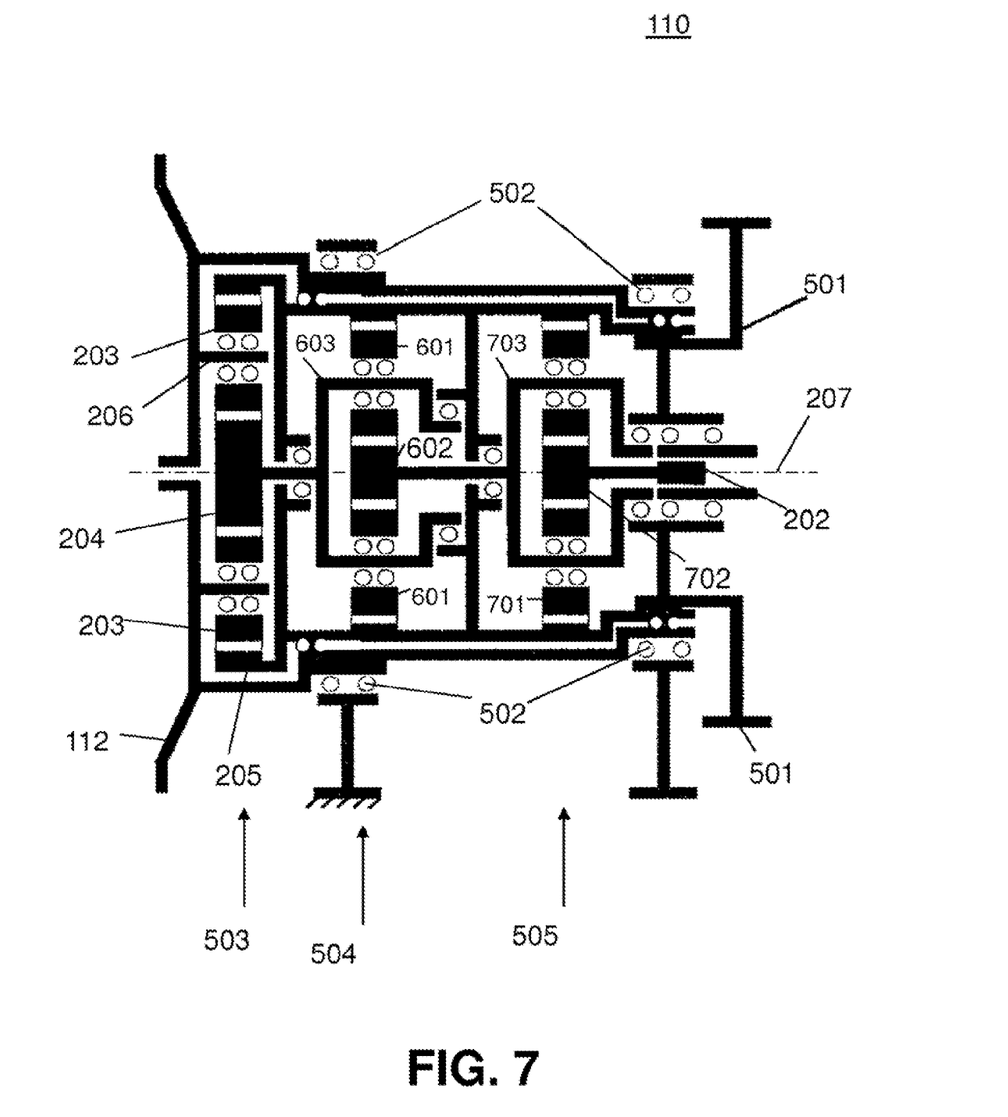
FIG. 7 is a cross-sectional view of a three-stage planetary drive, according to yet another typical embodiment.

FIG. 7 is a side cross-sectional view of a three-stage planetary drive arranged within a gearbox 110 of a wind turbine 100, according to another typical embodiment. The rotor shaft 112 is used as a housing for the three-stage planetary drive. Respective outer ring gears 205 of the three stages of the planetary drives 503, 504, and 505 i.e. the first stage planetary drive 503, the second stage planetary drive 504 and the third stage planetary drive 505 are fixed by means of the torque receiving element 501 such that the respective outer ring gears 205 are not rotating. The rotating parts include the planet gear support 206 (first stage), the second stage planet gear support 603 and a third stage planet gear support 703.

Thus the sun gear 204 of the first stage meshing with the planet gears 203 is driven such that the output rotational speed of the first stage planetary drive 503 is larger than the input rotational speed applied at the planet gear support 206. The second stage sun gear 602 of the second stage planetary drive 504 meshing with the second stage planet gears 601 of the second stage is driven such that the output rotational speed of the second stage planetary drive 504 is larger than the input rotational speed applied at the second stage planet gear support 603. Furthermore, a third stage sun gear 702 of the third stage planetary drive 505 meshing with third stage planet gears 701 of the third stage is driven such that the output rotational speed of the third stage planetary drive 505 is larger than the input rotational speed applied at the third stage planet gear support 703.

It is noted here, albeit not detailed in FIGS. 6 and 7 and the associated description, that the operation and components of the individual first stage, second stage and third stage planetary drives 503, 504 and 505 are similar to each other.

As can be seen from FIG. 6, only two rotor shaft bearings 502 (it is noted that the blank circles in FIGS. 6 and 7 denote bearings, e.g. roller bearings) are provided in order to rotatably hold the rotor shaft 112 and, according to a typical embodiment, also to hold the rotor shaft 112 together with the rotor including the hub 104 and the at least one rotor blade 101 of the wind turbine 100.

Thus, the first stage planetary drive 503 and the second stage planetary drive 504 forming the gearbox 110 of the wind turbine are received in the inner cavity, i.e. the rotor shaft cavity 115, see above, of the rotor shaft 112 which is rotating at a first rotational speed of the rotor of the wind turbine, i.e. at an input rotational speed 301.

An integrated drive train according to a typical embodiment is based on a large-sized, thin-walled hollow rotor shaft 112 with sufficient bending stiffness, wherein the multistage planetary drive is housed within the rotor shaft 112. Typically, the rotor shaft has two bearings. The rotor shaft is the wind load carrying design element on the one hand, and on the other hand the rotor shaft 112 acts as the planetary carrier.

Stages of the planetary drive may be assembled from the rotor side into the hollow shaft or, if more appropriate, first and eventually further planetary drives may be assembled from the rotor side, and the following planetary drives may be assembled from the generator side. An interior gear torque supporting structure is connected to an external torque arm, e.g. the torque receiving element 501 that is located behind the generator side rotor shaft mounting.

Furthermore, it is possible that the inner gear structure and the torque arm are formed as a single structure element. By installing the entire multistage planetary drive in the interior, i.e. in the rotor shaft cavity 115 of the rotor shaft 112, it is possible to reduce a length and a weight of the drive train of the wind turbine 100 and thus a length and a weight of the machine nacelle 103 of the wind turbine 100.

These advantages result in lower production costs for the machine nacelle 103 and potentially lower assembly costs. Furthermore, a coupling between the rotor shaft 112 and the gearbox 110 may be omitted. The rotor shaft 112 acts as a secure enclosure for the two-stage planetary drive (FIG. 6) or the three-stage planetary drive (FIG. 7).

Figure 8:
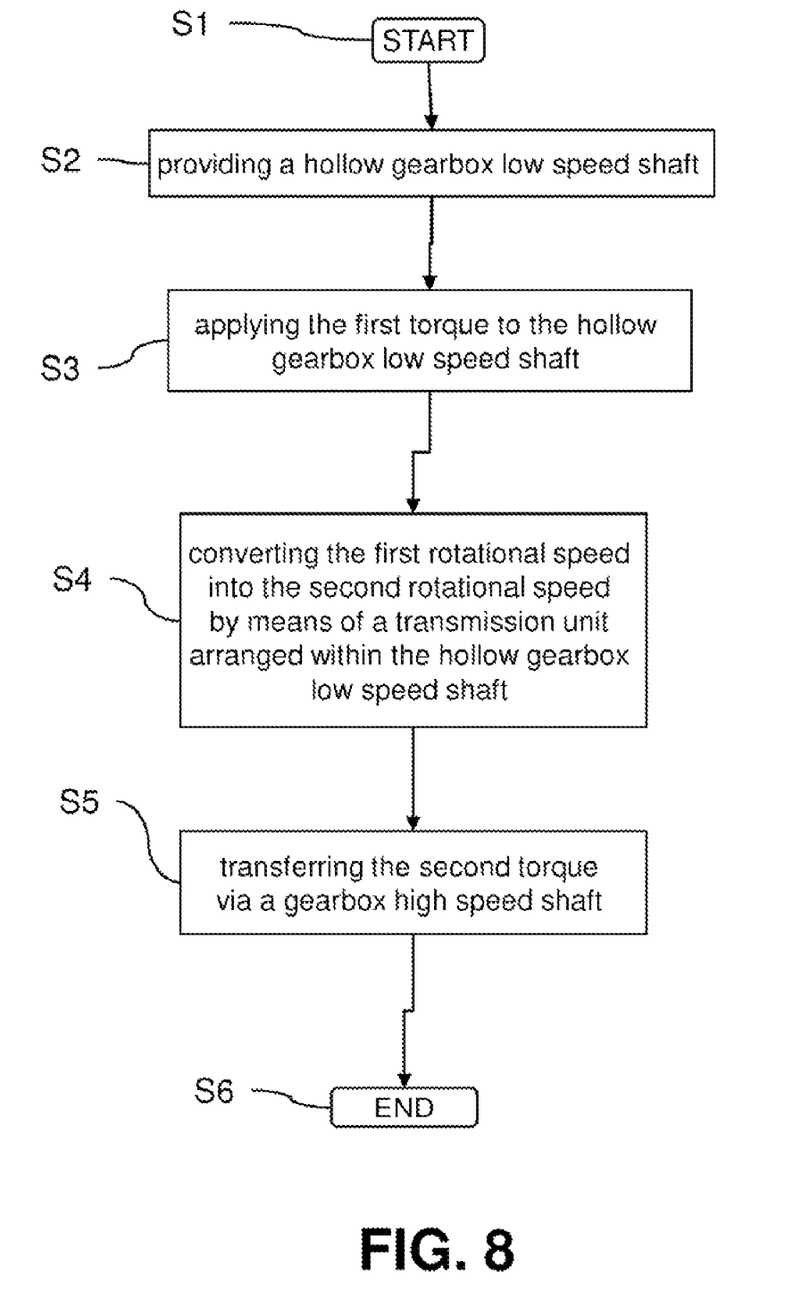
FIG. 8 is a flowchart illustrating a method for converting a first torque at a first rotational speed into a second torque at a second rotational speed by means of a planetary drive.

FIG. 8 is a flowchart illustrating a method for converting a first torque at a first rotational speed into a second torque at a second rotational speed. At a step Si, the procedure is started. Then the procedure advances to a step S2 where a hollow gearbox low speed shaft is provided. A first torque is applied to the hollow gearbox low speed shaft at a step S3. Then, the procedure advances to a step S4 where a first rotational speed is converted into a second rotational speed. This conversion is performed by a transmission unit arranged within the hollow gearbox low speed shaft.

In a following step S5, the second torque (at the second rotational speed) is transferred via a gearbox high speed shaft. The procedure is ended at a step S6.

The gearbox in accordance with a typical embodiment may be used in other systems besides wind turbines, such as mechanical driving systems where the input rotational speed is higher than the output rotational speed. In this case output and input shafts of the gearbox are exchanged, i.e. an input torque (at a high rotational speed) is applied at the high speed, and an output torque at a low rotational speed is provided at the low speed as an output.

The gearbox 110 of a wind turbine 100 may be typically arranged within the machine nacelle 103 of the wind turbine 100, the machine nacelle being rotatably mounted atop the wind turbine tower 102. As the machine nacelle 103 is rotated with respect to the incoming wind direction 105, weight and size of the machine nacelle 103 is an issue in wind turbine design. According to at least one typical embodiment such weight and size of the machine nacelle 103 may be reduced by using the hollow gearbox input shaft 201, the inner cavity 115 of which is housing, at least partially, the transmission unit.

Mounting space which is consumed by the gearbox 110 which is housed within the machine nacelle 103 may be reduced such that an axially shortened drive train may be obtained. Furthermore, an entire weight of the drive train may be reduced.

Using the gearbox device in accordance with at least one typical embodiment, an axial extension of a drive train of the wind turbine 100 may be reduced because at least a portion of the transmission unit may be housed within the input shaft.

Another issue with respect to the gearbox 110 of a wind turbine 100 are assembly costs. These costs may be reduced because of a reduced weight of the components and a reduced number of the components. Moreover, gearboxes 110 may be exchanged during the lifetime of a wind turbine 100. The costs for maintenance and drive train exchange thus may be reduced.

This written description uses examples to disclose the invention, including the best mode, and also to enable any person skilled in the art to practice the described subject-matter, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gearbox device adapted for converting a first torque at a first rotational speed into a second torque at a second rotational speed, the gearbox device comprising:
    a hollow gearbox input shaft adapted for inputting the first torque;
    a transmission unit arranged at least partially within the hollow gearbox input shaft and adapted for converting the first rotational speed into the second rotational speed; and,
    a gearbox output shaft adapted for outputting the second torque.

2. The gearbox device in accordance with claim 1, wherein the transmission unit comprises at least one planetary drive.

3. The gearbox device in accordance with claim 2, wherein the planetary drive comprises:
    an outer ring gear having its teeth directed inwardly;
    a sun gear adapted for providing the output torque; and,
    a planetary carrier having at least one planet gear, the at least one planet gear being adapted for meshing with the outer ring gear and the sun gear, wherein
    at least one of the outer ring gear and the planetary carrier is adapted to be driven by the input torque.

4. The gearbox device in accordance with claim 3, further comprising a stationary torque receiving element adapted for receiving torque applied at one of the planetary carrier or the outer ring gear.

5. The gearbox device in accordance with claim 1, wherein the transmission unit comprises at least two transmission stages engaging into each other.

6. The gearbox device in accordance with claim 1, wherein the transmission unit comprises a multistage planetary drive and/or a helical drive.

7. The gearbox device in accordance with claim 1, wherein at least two bearings are provided for supporting the hollow gearbox input shaft at least two axial positions along the length of the hollow gearbox input shaft.

8. A wind turbine comprising a rotor, an electrical generator and a gearbox device connected to the rotor and adapted for converting a first torque at a first rotational speed into a second torque at a second rotational speed, the gearbox device comprising:
    a hollow gearbox input shaft coupled to the rotor and being adapted for inputting the first torque;

a transmission unit arranged at least partially within the hollow gearbox input shaft and adapted for converting the first rotational speed into the second rotational speed; and, a gearbox output shaft adapted for outputting the second torque.

9. The wind turbine in accordance with claim 8, wherein the transmission unit comprises at least one single-stage or multistage planetary drive.

10. The wind turbine in accordance with claim 9, wherein the planetary drive comprises:
an outer ring gear having its teeth directed inwardly;
a sun gear adapted for providing the output torque; and,
a planetary carrier having at least one planet gear and adapted to be driven by the input torque, the at least one planet gear being adapted for meshing with the outer ring gear and the sun gear.

11. The wind turbine in accordance with claim 10, further comprising a torque receiving element adapted for receiving torque applied at the outer ring gear.

12. The wind turbine in accordance with claim 8, wherein the transmission unit comprises at least two transmission stages engaging into each other.

13. The wind turbine in accordance with claim 8, further comprising at least two bearings for supporting the hollow gearbox input shaft at least two axial positions along the length of the hollow gearbox input shaft.

14. The wind turbine in accordance with claim 13, wherein transverse and axial forces applied via the rotor are taken up by the input shaft.

15. The wind turbine in accordance with claim 8, wherein the hollow gearbox input shaft is a rotor shaft of the wind turbine.

16. The wind turbine in accordance with claim 15, wherein transverse and axial forces applied via the rotor are taken up by the input shaft.

17. A gearbox device adapted for converting a first torque at a low rotational speed into a second torque at a high rotational speed, the gearbox device comprising:
a low speed input shaft having an inner cavity and being adapted for inputting the first torque;
at least one planetary drive adapted to convert the low rotational speed into the high rotational speed and to fit at least partially into the inner cavity of the low speed input shaft; and,
a high speed output shaft adapted for outputting the second torque.

18. The gearbox device in accordance with claim 17, wherein the planetary drive comprises:
an outer ring gear having its teeth directed inwardly;
a sun gear adapted for providing the output torque; and,
a planetary carrier having at least one planet gear and adapted to be driven by the input torque, the at least one planet gear being adapted for meshing with the outer ring gear and the sun gear.

19. The gearbox device in accordance with claim 18, further comprising a torque receiving element adapted for receiving torque applied at the outer ring gear.

20. The gearbox device in accordance with claim 17, wherein at least two bearings are provided for supporting the low speed input shaft at least two axial positions along the length of the low speed input shaft.

* * * * *

UNITED STATES PATENT AND TRADEMARK OFFICE
CERTIFICATE OF CORRECTION

| | | |
|---|---|---|
| PATENT NO. | : 8,033,951 B2 | Page 1 of 1 |
| APPLICATION NO. | : 12/771206 | |
| DATED | : October 11, 2011 | |
| INVENTOR(S) | : Pischel | |

It is certified that error appears in the above-identified patent and that said Letters Patent is hereby corrected as shown below:

In Column 7, Line 25, delete "Si," and insert -- S1, --, therefor.

In Column 8, Line 59, in Claim 7, delete "at least" and insert -- at at least --, therefor.

In Column 9, Line 25, in Claim 13, delete "at least" and insert -- at at least --, therefor.

In Column 10, Line 28, in Claim 20, delete "at least" and insert -- at at least --, therefor.

Signed and Sealed this
Tenth Day of January, 2012

David J. Kappos
*Director of the United States Patent and Trademark Office*